United States Patent [19]

Anderson

[11] Patent Number: 4,528,768
[45] Date of Patent: Jul. 16, 1985

[54] FISHING ROD HOLDER

[76] Inventor: Joe C. Anderson, 202 W. Hambrick, Houston, Tex. 77037

[21] Appl. No.: 547,848

[22] Filed: Nov. 2, 1983

[51] Int. Cl.³ .............................................. A01K 97/10
[52] U.S. Cl. ..................................... 43/21.2; 248/538; 248/514; 403/374; 403/104
[58] Field of Search ................. 43/21.2; 248/538, 534, 248/518, 523; 403/351, 367, 374, 104

[56] References Cited

U.S. PATENT DOCUMENTS

| | | | |
|---|---|---|---|
| 3,484,066 | 12/1969 | Aunspaugh | 43/21.2 |
| 3,667,708 | 6/1972 | Smeltzer | 43/21.2 |
| 4,017,998 | 4/1977 | Dumler | 43/21.2 |

Primary Examiner—Kuang Y. Lin
Assistant Examiner—C. McKee
Attorney, Agent, or Firm—Darryl M. Springs

[57] ABSTRACT

A fishing rod holder comprising a mounting bracket for attachment to a structural member of a boat, a tubular body member having open ends for receiving a rod handle inserted through one end and having a slot longitudinally disposed in the side thereof, mounting means for mounting the tubular body member on the mounting bracket to provide limited pivotal vertical movement with respect to the mounting bracket, a lever block mounted for limited pivotal movement with respect to the tubular member and carrying therethrough a threaded rod having a handle and a camming head with the camming head and the end of the rod projecting into the body member slot, and a tongue member having a generally semicircular cross-section disposed inside the body member and meeting and fastened at one end to the interior of the body member and covering the slot. The rod drives the camming head into deflecting engagement with the free end of the tongue to deflect the tongue toward the interior of the body member and into locking engagement with a fishing rod handle when the lever block is in a locked position. When the lever block is rotated to an open position, the camming head is rotated out of engagement with the tongue member and into the slot for releasing engaging pressure on the fishing rod handle. Another embodiment of a mounting bracket used to mount the fishing rod holder on rail-like structural members is also disclosed.

19 Claims, 7 Drawing Figures

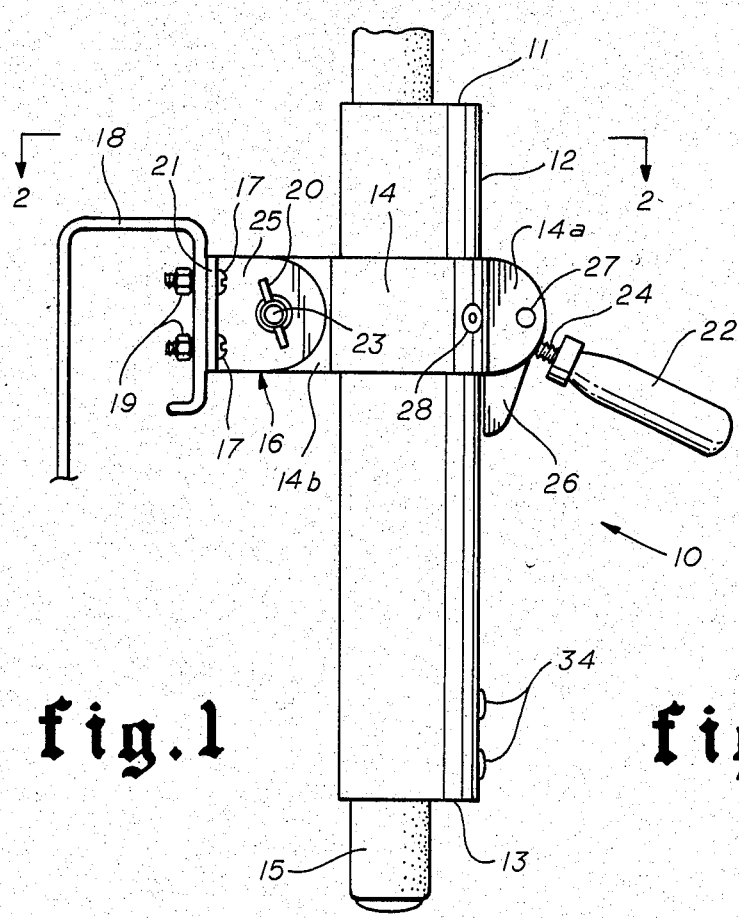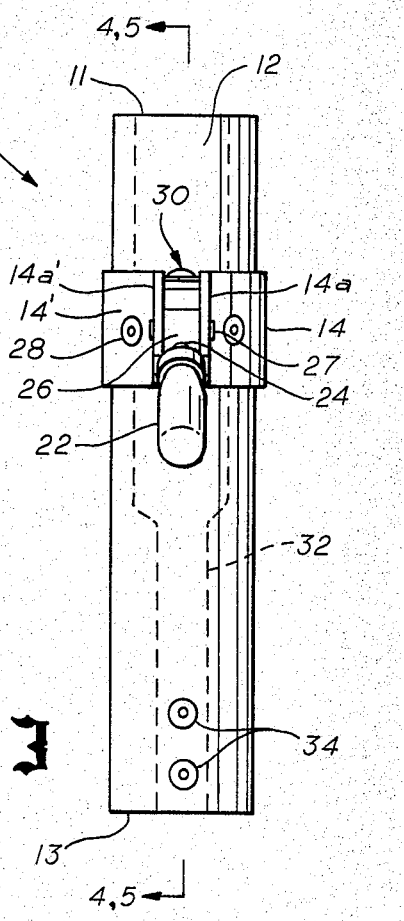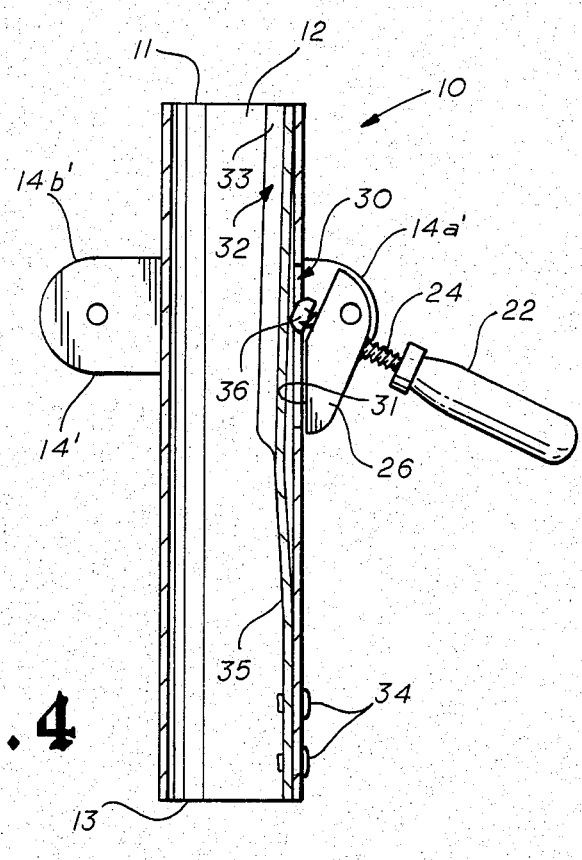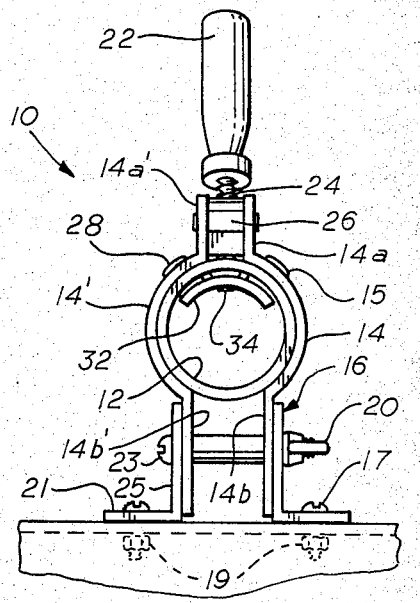
fig.1
fig.3
fig.4
fig.2

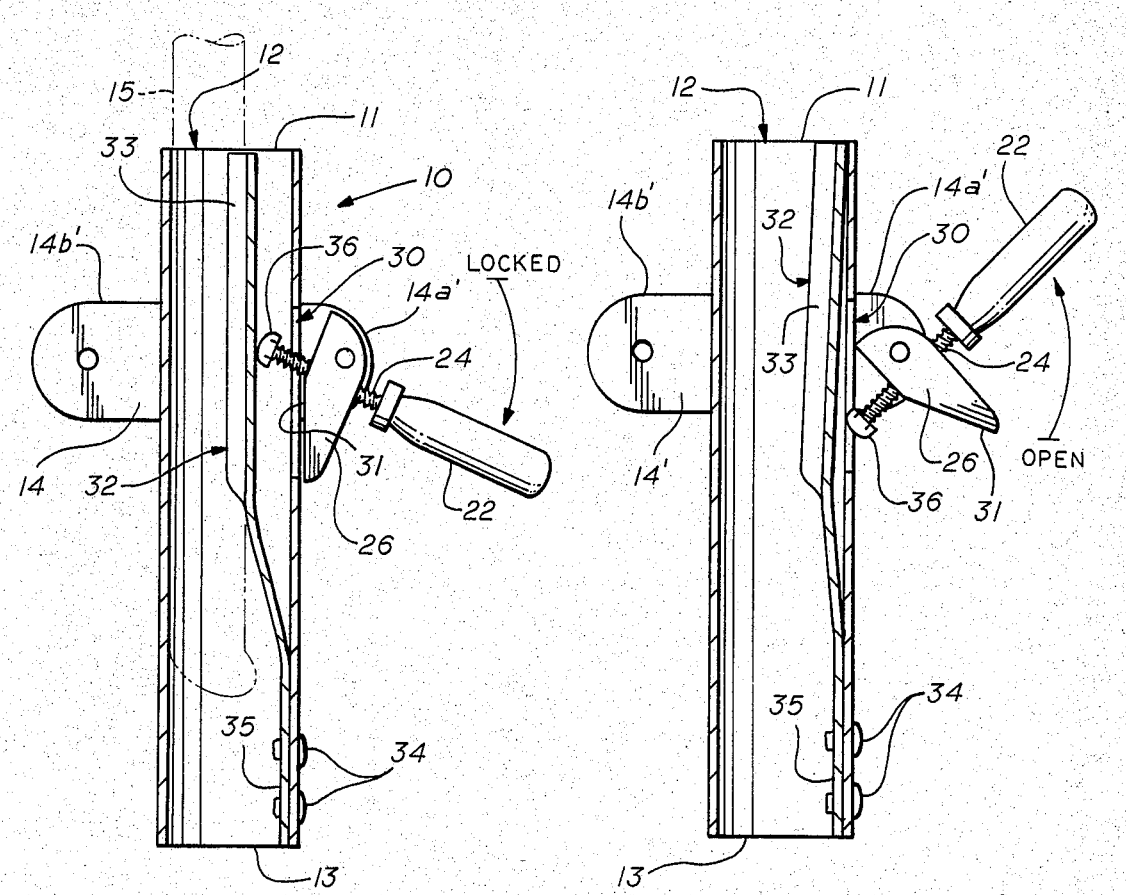
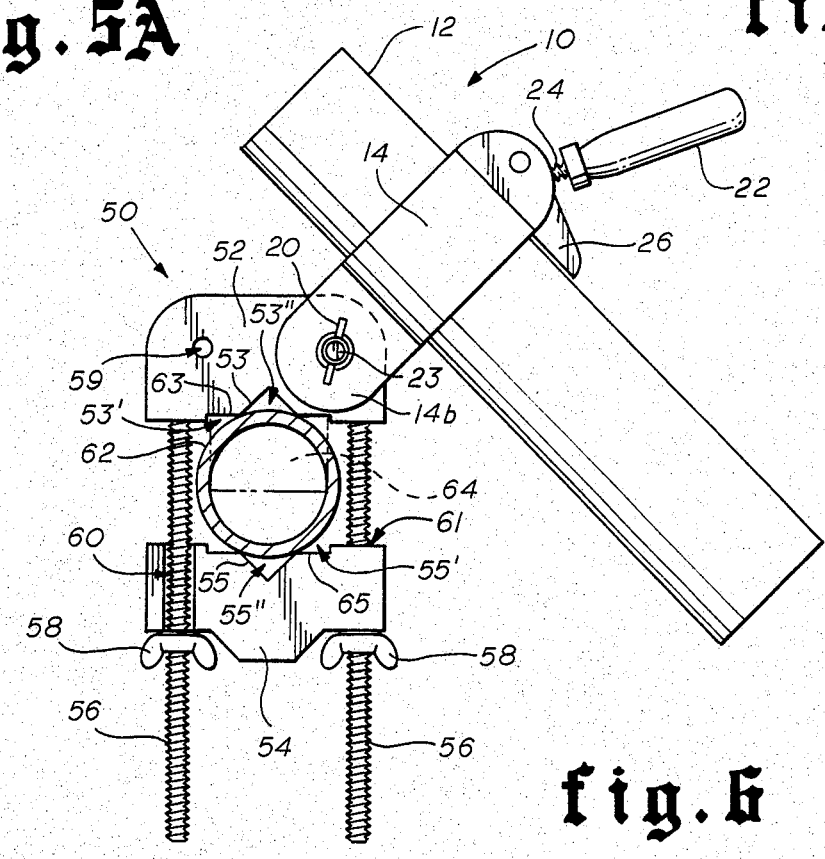

FISHING ROD HOLDER

BACKGROUND OF THE INVENTION

This invention relates to fishing tackle accessories and more particularly to an adjustable holder for fishing rods.

Fishermen have long been plagued by how to securely hold a fishing rod in a boat, particularly while trolling, or on a fishing dock or pier, while waiting for a fish to strike. Fishermen have tried to solve this problem by just laying the rod in the boat while trolling or laying the rod on the dock or pier. However, while trolling if the lure or hook strikes an obstruction the rod can easily be jerked out of the boat, losing the rod, reel and lure, or at best, the rod may break or be damaged. If a fish violently strikes the boat or lure, the rod may be pulled overboard both in the situation while trolling from a boat or while fishing from a dock or pier. In addition, if one fisherman in a boat is trolling and another is casting, it often results in tangling of lines unless the trolling rod can be kept in a low profile position.

There have been attempts to solve this problem, the simplest being a tube that mounts in a boat and which can be secured permanently in a vertical position for loosely holding a fishing rod handle. But the fishing rod must be maintained in a generally vertical position or it will slide out of the tube, and on "hard" strikes or if the hook catches on an obstruction the rod will be subject to being jerked overboard.

Other attempts have been made to devise adjustable, pivoting holders and the like, but they have been limited in the positioning of the rod with respect to the boat or other structural member to which they have been mounted, or the means for securing the rod handle in the holder does not have a convenient means for adjusting to differing size and configurations of rod handles, or does not provide for a "quick-release" of the rod handle, but involves turning screws and fumbling with the holder, thereby wasting time in the event of a strike by a fish. This prior art is illustrated by the following U.S. Pat. Nos.: 2,548,351; 2,954,909; 3,161,390; 3,802,112; 3,897,922; 3,903,634; and 4,017,998.

However, none of the prior art devices have included the features of being adjustable for accommodating a wide variety of rod sizes and configurations, permit the securely locked rod to be positioned anywhere from a generally vertical position to a generally horizontal position in a boat, and provide a "quickrelease" mechanism for instantaneously releasing the rod handle from the holder.

SUMMARY OF THE INVENTION

The present invention remedies the problems of the prior art by providing an adjustable fishing rod holder that comprises mounting bracket means adapted for attachment to a structural member and providing rigid projecting mounting surfaces; a tubular body member open at both ends, one upper end adapted for receiving and accepting various lengths of fishing rod handles, the body member having an elongated slot longitudinally disposed in one side thereof; a pair of bracket members having a generally semicircular cross-sectional configuration with radially outwardly projecting flanged ends, the pair of bracket members being disposed about the tubular body member in an opposed relationship in mating contact therewith for positioning one pair of the facing flanged ends of the bracket members to form a first pair of spaced projecting flanges positioned adjacent to and on opposite sides of the tubular body member longitudinal slot and the other pair of spaced projecting flanges located on the opposite side of the tubular body member for pivotally mating with and engaging the mounting bracket means; for attaching the pair of bracket members to the tubular body member; attachment means for pivotally mounting the second pair of spaced projecting flanges to the mounting bracket means for permitting the tubular body member limited arcuate movement with respect to the mounting bracket means and for permitting locking engagement therebetween in any selected position within the limited arcuate traverse; a tongue member having a semi-circular cross-sectional configuration and dimensioned to mate with the interior arcuate curve of the tubular body member, one end of the tongue member having a narrowed width dimension and attached to the inner surface of the tubular body member adjacent to the lower open end for positioning the tongue member in a generally mating relationship with the inner surface of the body member and closing the elongated slot disposed therein, the tongue member further having a slight longitudinal outward curvature for biasing the unattached end of the tongue member snugly against the inner surface of the body member; a generally wedge-shaped lever block cooperating with the first pair of spaced projecting flanges for providing limited rotational movement therebetween, the wider dimension of the block oriented toward the one upper end of the tubular member, the lower surface of the block substantially covering the tubular member slot; a mounting pin disposed transversely through the lever block and the first pair of spaced projecting flanges for permitting limited rotational movement of the lever block with respect to the flanges from the first position where the lever block bottom surface covers the slot and is in contact with the tubular member outer surface to a second position where the lever block is disposed angularly with respect to the tubular member and exposes the slot; a threaded rod having a handle on one end and a camming head on the other end and threadably disposed through the lever block for projecting the camming head through the tubular member slot into contact with the tongue member; the threaded rod being adjustably positionable into and out of the tubular body slot for permitting the camming head to engage and depress the tongue member into the interior of the tubular member when the lever block is rotated to the first position for causing the tongue member to snugly engage a rod handle inserted into the tubular member one open end; and the camming head of the threaded rod being rotatably pivoted out of contact with the tongue member through the tubular member slot when the lever block is rotated to the second position for causing the tongue member to return to contact with the interior surface of the tubular member and releasing the rod handle and permitting removal thereof from the tubular member.

In a further embodiment of the invention where a structural member is a circular or rectangular cross-sectional rail-like member, the mounting bracket means comprises a pair of jaw members positioned in an opposed complementary relationship, each of the jaw members having centrally located gripping portions disposed in the one facing edge thereof and adapted for gripping rectangular and circular cross-sectional members, one of the pair of jaw members having spaced transverse apertures therethrough for cooperating with the body bracket projecting mounting means and the attachment means for mounting the bracket means and the tubular body member thereto, the second one of the jaw members having a pair of holes disposed transversely through the width of the jaw member adjacent to and spaced on opposite sides of the gripping portion thereof and communicating with the edge carrying the gripping portion; a pair of threaded rods fixed to the one of the jaw members and projecting from the edge thereof carrying the gripping portion in a spaced parallel relationship registering with the pair of spaced holes in the second jaw member; the second jaw member being slidable over the projecting rods through the pair of spaced holes for guiding the second jaw member into an opposed spaced position with respect to the one jaw member and registering the gripping portions thereof in an opposed spaced relationship for engaging the rail-like member therebetween, the projecting ends of the threaded rods extending through the second jaw member and projectly freely from the other side thereof; and a pair of fasteners adapted for threadably engaging the freely projecting ends of the pair of rods and engaging the second jaw member for urging the member into clamping engagement with the one jaw member about the rail-like member.

Accordingly, one principal feature of the present invention is to provide a quickly releasable fishing rod holder that instantaneously releases the fishing rod handle and permits removal of the rod from the holder.

Yet another principal feature of the present invention is to provide a fishing rod holder that is easily and quickly adjustable to accomodate differing fishing rod handle thicknesses and configurations.

Another principal feature of the present invention is to provide mounting bracket means that will mount the fishing rod holder on a structural member, such as the gunwale of a boat, or on a rectangular of circular cross-sectioned rail-like member.

Still another principal feature of the invention is to provide a fishing rod holder mounting bracket means that permits the fishing rod holder to be selectively positioned in an arcuate traverse from at least generally vertical to horizontal.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to furhter equally effective embodiments.

In the drawings:

FIG. 1 is a side elevational view of the fishing rod holder according to the present invention shown mounted on a boat gunwale.

FIG. 2 is a horizontal cross-sectional view of the fishing rod holder as taken along lines 2—2 of FIG. 1.

FIG. 3 is a front elevational view of the fishing rod holder according to the present invention showing the position of the tongue member.

FIG. 4 is a vertical cross-sectional view of the fishing rod holder as taken along lines 4—4 of FIG. 3.

FIG. 5A is a vertical cross-sectional view of the fishing rod holder as taken along lines 5—5 of FIG. 3 and showing the locking lever in the locked position and depressing the tongue member into the tubular body member.

FIG. 5B is a vertical cross-sectional view of the fishing rod holder as taken along lines 5—5 of FIG. 3 and showing the locking lever in the open position disengaged from the tongue member.

FIG. 6 is a side elevational view of another embodiment of mounting bracket for use in connection with mounting the fishing rod holder on circular or rectangular cross-sectioned rail members.

DETAILED DESCRIPTION OF THE PREFERRED EMBODIMENTS

Referring to FIGS. 1, 2 and 3, the fishing rod holder 10 according to the present invention is shown mounted on the gunwale 18 of a boat. of course, the fishing rod holder 10 could be mounted on any other rigid structural member such as a boat deck or bulkhead or a dock or pier railing or a deck. The fishing rod holder 10 is designed to receive and lock into position the handle of a spinning or casting rod 15.

Fishing rod holder 10 includes an elongated tubular body member 12 having an open receiving end 11 and an open bottom end 13, a body bracket means 14 fixed to the tubular body member 12 and positioned transverse to the longitudinal axis of member 12, and a mounting bracket means 16 rigidly attached to the boat gunwale 18 for cooperating with the body bracket means 14 to mount the fishing rod holder. The tubular body member 12 also has an elongated longitudinally disposed slot 30 in one side thereof, the purpose of which will be hereinafter further explained.

The body bracket means 14 comprises a bracket 14-14' substantially encircling the tubular body member 12 and terminating on the side of the member 12 carrying the slot 30 in a lever mounting means 14A-14A' positioned adjacent to and on opposite sides of the slot 30. The other end of the bracket means 14-14' terminates on the side of body member 12 opposite the lever mounting means 14A-14A' in a projecting mounting means 14B-14B' adapted pivotally mating with and engaging the mounting bracket means 16. A mounting means, such as a bolt or rod with a threaded end 23, and a threaded fastener such as wing nut 20, is provided for pivotally mounting the body bracket means projecting engaging means 14B-14B' to the mounting bracket means 16 for permitting the tubular body member 12 limited arcuate movement with respect to the mounting bracket 16 and for permitting locking engagement therebetween. The nut 20 may be tightened on bolt 23 to clamp the mounting bracket means 16 and the body bracket means 14-14' (14B-14B') together for locking engagement in any selected position within the limited arcuate traverse of the holder 10 body member 12 with respect to the gunwale 18.

The mounting bracket means 16 provides a pair of spaced projecting bracket flanges 25-25 and, in the embodiment shown, comprises a pair of L-shaped mounting bracket members 16 having a projecting flange portion 25 and a mounting flange portion 21. The mounting bracket members 16 are mounted in a spaced-apart relationship to a structural member, such as gunwale 18, by any conventional fastening means, such as by nuts and bolts 17 and 19, respectively. Of course, any other suitable fastening means, such as rivets or an adhesive (not shown), may be used if the mounting brackets 16 can be rigidly attached to the structural member. The spaced-apart bracket members 16 are positioned with their respective bracket flanges 25 in a facing orientation to provide a pair of spaced projecting flanges for mounting the body member 12 and body bracket means 14-14'. Apertures are provided in each bracket flange 25 for accomodating the bolt 23.

The body bracket means 14-14', in the preferred embodiment shown in FIGS. 1-3, comprises a pair of generally semi-circular shaped straps 14 and 14' having outwardly projecting flanged ends 14A-B and 14A'-B'. The brackets or straps 14 and 14' are positioned about the outer diameter of the body member 12 and transverse to the longitudinal axis thereof. The end flanges 14A and 14A' are positioned to be adjacent to and on opposite sides of the slot 30 to form a first pair of spaced facing projecting flanges 14A and 14A' that comprise the previously described lever mounting means. The end flanges 14B and 14B' terminate on the opposite side of said body member 12 and form a second pair of spaced facing projecting flanges 14B and 14B' that comprise the mounting means above described. The brackets 14 and 14' may be mounted on tubular member 12 using any conventional attaching means, such as a fastener, or rivet 25, or an adhesive (not shown).

The tubular body member 12 may be constructed of any lightweight, rigid and strong material such as a metal, like steel or aluminum, or a rigid plastic material. In the preferred embodiment shown, the tubular member 12 is constructed of a length of tubular rigid plastic material, which combines weight, rigidity and strength along with maximum corrosion resistance and minimum cost. The mounting brackets 16 and the body brackets 14 and 14' may be constructed of any strong lightweight material such as metals, like steel or aluminum, or molded of a suitable plastic material having the necessary strength requirements. In a preferred embodiment the aluminum or molded plastic material would be used, since they also possess the quality of maximum corrosion resistance. In a saltwater environment, a preferred embodiment would include a tubular body member 12 and mounting and body brackets 16 and 14, respectively, constructed of a plastic material for maximum corrosion resistance.

Referring now additionally to FIG. 4, a tongue member 32 is mounted within the body member 12 for reasons that will be hereinafter further explained. The tongue 32 may be constructed of any suitable material that is rigid but has the ability to flex under pressure and return to its original position after repeated flexings. In the preferred embodiment shown, the tongue 30 is constructed of a rigid plastic material and has a semi-circular cross-section. One end 33 is wider and acts as the receiving end of tongue 32 and is disposed in tubular member 12 closely adjacent the open receiving end thereof. The other end 35 of tongue 32 tapers to a much narrower width and is the mounting end for securing tongue 32 to the interior of body member 12. The mounting end 35 may be secured to the inner surface of member 12 by any conventional fastening means which may conveniently be brads or rivets 34.

Tongue 32 has a slight longitudinal outward curvature, as may more readily be seen in FIG. 4, for biasing the unattached wider end 33 snugly against the inner surface of the body member 12. This slight outward curvature always insures that there is an outward bias to seat the end 33 against the inside of member 12 after the tongue has been released from its rod handle 15 locking position as will be hereinafter further explained and to insure that the free end 33 of tongue 32 does not interfere with the insertion of a rod handle 15 into the interior of tubular member 12.

Referring now additionally to FIGS. 5A and 5B, the action of the locking lever will now be described. Disposed between the first pair of spaced projecting flanges 14A and 14A' is a generally wedge-shaped lever block 26. The wider end or dimension of the lever block is oriented toward the open end 11 of the tubular member 12. The lower side or surface 31 of the lever block 26 substantially covers the elongated slot 30 in tubular member 12. Apertures in the flanged ends 14A and 14A' register with an aperture in the lever block 26 to receive a mounting pin 27 that is disposed transversely therethrough and permits limited rotational movement of the lever block 26 with respect to the flanges 14A and 14A'. The lever block 26 is rotationally movable from a first position where the lever block lower surface 31 substantially covers the slot 30 and is in contact with a portion of the outer surface of tubular body member 12 (see FIG. 5A) to a second position where the lever block 26 longitudinal axis is angularly disposed with respect to the surface of tubular body member 12 and uncovers the slot 30 (see FIG. 5B) for purposes to be hereinafter more fully described and explained.

A threaded rod or lever 24, having a handle 22 on one end and a camming head 36 on the other end is threadably disposed through the lever block 26. Twisting handle 22 screws the rod 24 into or out of the lever block 26, and raises or lowers the camming head 36 with respect to the lever block lower surface 31. With the lever block 26 rotated to its first or "locked" position where the lever block lower surface 31 substantially covers the tubular member slot 30 and contacts the outer surface of member 12, camming head 36 is projected into and through the slot 30 to the interior of tubular body member 12 and into contact with the outer surface of the wider end 33 of tongue 32. If the threaded rod 24 is screwed into the lever block 26, the camming head 36 attached to rod 24 is driven into the interior of tubular member 12, thus also depressing and deflecting tongue 32 into the interior of member 12 for engaging and locking a fishing rod handle 15 as shown in dotted lines in FIG. 5A. In this way, the degree of deflection of tongue 32 in order to engage rod handles 15 of varying thickness and configurations can be controlled precisely by the depth that the camming head 36 and rod 24 are screwed into tubular member 12 through slot 30 when the lever block 26 is in the first or "locked" position shown in FIG. 5A. Further, the "tightness" of "snugness" of the gripping action of the tongue wide end 33 pressing against a rod handle can be adjusted by the pressure exerted by the camming head 36 against the outer surface of tongue 32 by an additional rotation or two of the threaded rod into tubular member 12. The rod 15 is now securely locked into the tubular body member 12, and snags or strikes on a trailing line cannot pull the rod handle from the fishing rod holder 10. The gripping pressure on the rod handle can be adjusted to securely hold the rod without damaging the rod handle with sufficient gripping force that the fishing line would break before the rod handle can be pulled from the holder 10.

In order to quickly release the rod handle 15 from holder 10 in the event of a strike by a fish on a trailing line and lure or bait, it is not necessary to unscrew rod 24 outward from lever block 26. To quickly release the rod handle, the threaded rod handle 22 can be pushed upwardly in one smooth motion, and the threaded rod 24 then acts as a lever to rotate the lever block 26 upwardly to its second or "open" position as shown in FIG. 5B. Rotating the "lever" rod 24 and lever block 26 upwardly rotates the camming head 36 downwardly and out into slot 30 and out of engaging contact with the tongue member 32. With the deflecting pressure exerted by camming head 36 on tongue 32 released, the tongue 32 will "snap" back to its normal position with the wide end 33 in contact with the interior surface of tubular member 12, thus releasing the gripping or locking pressure on the rod handle 15. The rod can then be quickly withdrawn from the tubular body member 12 for handling the rod and reel in a conventional manner. In the second or "open" position, the lever block 26 is angularly disposed with respect to the surface of member 12 and has uncovered the slot 30 to permit the rotation of camming head 36 out through the slot. The fishing rod holder is now ready for the insertion of another rod handle, and if previously adjusted to the rod handle, the lever 24 only has to be pushed downwardly to rotate the lever block 26 back to its first or "locked" position and rotate the camming head 36 inwardly into slot 30 and the interior of member 12 to engage and cam the tongue 32 to an inwardly deflected position to again engage and lock a rod handle 15 into body member 12.

The camming head 36 is generally ball-shaped but it is preferable to have the outer surface opposite rod 24 in a slightly flattened configuration to increase the surface area of the outer portion of the camming head 36 that is in contact with the outer surface of the tongue member 32. The increased surface contact area increases the frictional forces acting between the camming head 36 and the tongue 32 when the lever block is rotated to the first or "locked" position and the camming head 36 acts to deflect tongue 32 into gripping and locking contact with the rod handle 15. In addition, the angle at which the rod or lever 24 is disposed with respect to the deflected tongue member 32 and with respect to the lever block 25 acts as a natural locking angle for maintaining lever 24 and lever block 26 in a firmly locked position as shown in FIG. 5A. Accordingly, it will take positive upward force exerted on lever 24 to overcome the frictional locking forces between the camming head 36 and the tongue 32 and to release the rod handle 15. This insures that the lever 24 will not accidently be rotated upwardly and release rod handle 15 due to minor or accidental bumps or blows.

Referring now to FIG. 6, another embodiment of the mounting bracket means 16 is shown as an adjustable mounting bracket means 50 for use in mounting the fishing rod holder to a structural rail-like member having a rectangular 64 or circular 62 cross-sectional configuration. Such a rail-like member may be a railing on a larger boat or a rail associated with a dock or fishing pier. In its basic construction, the mounting bracket means 50 comprises a pair of jaw members 52 and 54 positioned in an opposed complementary relationship, with each of the jaw members 52 and 54 having facing centrally located gripping portions 53 and 55, respectively, that are disposed in the facing edges or sides of jaw members 52 and 54. The gripping portions 53 and 55 are adapted for gripping rectangular and circular cross-sectional rail-like members 64 and 62, respectively due to each having a configuration consisting of a generally rectangular cut-out section 53' and 55' communicating centrally with the facing edges or sides of jaw members 52 and 54, and a V-shaped notch portion 53" and 55" cut centrally into the interior sides 63 and 65 of the rectangular cut-out sections 53' and 55', respectively. The facing rectangular cut-out section members 53' and 55' will accommodate rectangular cross-section members 64, while the facing V-shaped cut-out sections 53" and 55' will accommodate circular cross-section members 62 as shown in FIG. 6.

Jaw member 52 has at least a pair of spaced apertures 59 disposed transversely therethrough for cooperating with the spaced projecting flanges 14B and 14B' and locking nut and bolt 20 and 23 for mounting the bracket means 14 and tubular body member 12. The body member 12 may be positioned in any angular position within about a 90° angle with respect to jaw member 52 and locking the wing nut 20.

A pair of threaded rods 56 are fixed into one edge or side of jaw member 52 and project therefrom in a spaced parallel relationship toward the jaw member 54. Jaw member 54 has a pair of spaced parallel aperatures 60 and 61 disposed transversely therethrough which communicate with the jaw edge carrying the cut-out or gripping portion 55 and spaced on opposite sides thereof. One of the apertures may preferably be a slot or channel having a generally semi-circular cross-sectional configuration and communicating with one flat face of jaw member 54 for purposes that will be hereinafter further explained. The pair of projecting threaded rods 56 are slidably insertable into the apertures 60 and 61 in jaw member 54 for guiding the second member into a spaced, opposing position to jaw member 52 to register the gripping portions 53 and 55 in an opposed, spaced relationship in order to grip a rail-like member 62 or 64 therebetween as hereinabove described. The projecting ends of the threaded rods 56 extend through jaw member 54 and project freely from the other side thereof for accepting a pair of conventional fasteners 58, which may preferably be wing nuts 58 as shown in FIG. 6, for engaging the free threaded ends of rods 56 and engaging the jaw member 54 and urging the jaw member into clamping engagement with jaw member 52.

The generally semi-circular cross-sectioned channel or slot 60 disposed in jaw member 54 permits the jaw member 54 to rotate about the one rod 56 inserted through aperture 61 to facilitate positioning of the mounting means 50 over a rail-like member 62 or 64. The jaw member 54 can then be rotated back to engage the other rod 56 in the registering channel 60 to properly position and align jaw member 54 in an opposed, facing relationship with jaw member 52 prior to tightening fasteners 58 and clamping the rail-like member, 62 or 64, therebetween. Of course, the apertures 60 and 61 may be identical drilled holes and jaw member 54 must be completely removed from rods 56 in order to position means 50 about a rail-like member 62 or 64. However, if aperture 60 is the generally semi-circular cross-sectioned channel or slot as above described, then the mounting means 50 has an additional advantageous "quick detachable" feature.

Numerous variations and modifications may be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. An adjustable fishing rod holder comprising:

mounting bracket means adapted for attachment to a structural member and providing rigid projecting mounting surfaces, a tubular body member open at both ends, the upper end adapted for receiving and accepting various lengths and configurations of fishing rod handles, said body member having an elongated slot longitudinally disposed in one side thereof, body bracket means fixed to said tubular body member and positioned transverse to the longitudinal axis thereof, said body bracket means terminating on the side thereof carrying said longitudinal slot in a lever mounting means positioned adjacent to and on opposite sides of said longitudinal slot, said body bracket means terminating on the opposite side of said tubular body member in a projecting mounting means adapted for pivotally mating with and engaging said mounting bracket means, attachment means for pivotally mounting said body bracket projecting mounting means and said mounting bracket means for permitting said tubular body member limited arcuate movement with respect to said mounting bracket means and for permitting locking engagement therebetween in any selected position within the limited arcuate traverse, a tongue member having a generally semi-circular cross-sectional configuration and dimensioned to mate with the interior arcuate curve of said tubular body member, one end of said tongue member having a narrowed width dimension and attached to the inner surface of said tubular body member adjacent to the lower open end for positioning said tongue member in a generally mating relationship with the inner surface of said body member and closing said slot disposed therein, said tongue member further having a slight longitudinal outward curvature for biasing the unattached end of said tongue member snugly against the inner surface of said body member, a generally wedge-shaped lever block cooperating with said lever mounting means for providing limited rotational movement therebetween, the wider dimension of said block oriented toward said upper open end of said tubular member, the lower surface of said block substantially covering said tubular member slot, a mounting pin disposed transversely through said lever block and cooperating with said lever mounting means for permitting limited rotational movement of said lever block with respect to said lever mounting means from a first position where said lever block bottom surface substantially covers said slot and is in contact with said tubular member outer surface to a second position where said lever block is disposed angularly with respect to said tubular member and substantially exposes said slot, a threaded rod having a handle on one end and a camming head on the other end and threadably disposed through said lever block for projecting said camming head through said tubular member slot into contact with said tongue member, said threaded rod being adjustably positionable into and out of said tubular body slot for permitting said camming head to engage and depress said tongue member into the interior of said tubular member when said lever block is rotated to said first position for causing said tongue member to snugly engage the handle of a rod inserted into said tubular member upper open end, and said camming head of said threaded rod being rotatably pivoted out of contact with said tongue member through said tubular member slot when said lever block is rotated to said second position for causing said tongue member to return to contact with the interior surface of said tubular member for releasing said rod handle and permitting removal thereof from said tubular member.

2. The fishing rod holder as described in claim 1, wherein said structural member is the relatively flat surface of the gunwale of a boat, and wherein said mounting bracket means comprises:

bracket means adapted for mounting on said gunwale relatively flat surface and having a pair of spaced mounting flanges projecting therefrom, and fastening means for rigidly fastening said bracket means to said gunwale surface.

3. The fishing rod holder as described in claim 2, wherein said bracket means comprises a pair of generally L-shaped brackets that are mounted on said gunwale in a spaced relationship with the outwardly projecting legs of each of said L-shaped brackets providing said pair of spaced mounting flanges.

4. The fishing rod holder as described in claim 1, wherein said body bracket means comprises bracket means substantially encircling said tubular body member and wherein said lever mounting means comprises a pair of spaced flanges positioned adjacent to and on opposite sides of said tubular body member longitudinal slot and projecting outwardly therefrom.

5. The fishing rod holder as described in claim 4, wherein said bracket means comprises a pair of bracket members having a generally semicircular cross-sectional configuration with radially outwardly projecting flanged ends, said pair of bracket members being disposed about said tubular body member in an opposed relationship in mating contact therewith for positioning one pair of said facing flanged ends of said bracket members to form a first pair of spaced projecting flanges positioned adjacent to and on opposite sides of said tubular body member slot and the other pair of said facing flanged ends forming a second pair of spaced projecting flanges located on the opposite side of said tubular body member for comprising said projecting mounting means, and means for attaching said pair of bracket members to said tubular body member.

6. The fishing rod holder as described in claim 3, wherein said pair of projecting spaced mounting flanges of said mounting bracket means have transversely aligned apertures therein, and wherein said attachment means comprises:

a bolt having one threaded end for insertion through said transversely aligned apertures in said spaced mounting flanges and pivotally engaging said body bracket projecting mounting means, and a threaded retaining member for engaging said threaded end of said bolt and cooperating with said spaced mounting flanges and said body bracket projecting mounting means for locking said means with respect to said spaced mounting flanges in a selected angular relationship.

7. The fishing rod holder as described in claim 5, wherein said second pair of spaced projecting flanges have transversely aligned apertures therein, and wherein said attachment means comprises:
- a bolt having one threaded end for insertion through said transversely aligned apertures in said second pair of spaced projecting flanges and pivotally engaging said mounting bracket means, and
- a threaded retaining member for engaging said threaded end of said bolt and cooperating with said second pair of spaced projecting flanges and said mounting bracket means for locking said means with respect to said second pair of spaced projecting flanges in a selected angular relationship.

8. The fishing rod holder as described in claim 1, wherein said camming head is generally ball-shaped with the outer surface opposite said threaded rod having a slightly flattened configuration for increasing the surface area of said camming head in contact with said tongue member and increasing the frictional forces between said camming head and said tongue member when said lever block is rotated to said first position.

9. The fishing rod holder as described in claim 1, wherein said structural member is a circular or rectangular cross-sectional rail-like member, and wherein said mounting bracket means comprises:
- a pair of jaw members positioned in an opposed complementary relationship, each of said jaw members having centrally located gripping portions disposed in the one facing edge thereof and adapted for gripping rectangular and circular cross-sectional members, one of said pair of jaw members having spaced transverse apertures therethrough for cooperating with said body bracket projecting mounting means and said attachment means for mounting said bracket means and said tubular body member thereto, the second one of said jaw members having a pair of holes disposed transversely through the width of said jaw member adjacent to and spaced on opposite sides of said gripping portion thereof and communicating with the edge carrying said gripping portion,
- a pair of threaded rods fixed to said one of said pair of jaw members and projecting from the edge thereof carrying said gripping portion in a spaced parallel relationship registering with said pair of spaced holes in said second jaw member,
- said second jaw member being slidable over said projecting rods through said pair of spaced holes for guiding said second jaw member into an opposed spaced position with respect to said one jaw member and registering said engaging portions thereof in an opposed spaced relationship for gripping the rail-like member therebetween, the projecting ends of said threaded rods extending through said second jaw member and projectly freely from the other side thereof, and
- a pair of fasteners adapted for threadably engaging said freely projecting ends of said pair of rods and engaging said second jaw member for urging said member into clamping engagement with said one jaw member about the rail-like member.

10. The fishing rod holder as described in claim 9, wherein said gripping portion of each of said pair of jaw members comprises a cut-out portion from the facing edges of said jaw members having a configuration consisting of a generally rectangular cut-out section centrally disposed in said edge thereof carrying said gripping portion and a V-shaped notch portion cut centrally into the interior side of said rectangular cut-out section for accommodating rectangular and circular cross-sectioned members therebetween.

11. The fishing rod holder as described in claim 9, wherein one of said pair of spaced holes disposed in said second jaw member is a channel having generally semicircular cross-section disposed in said second jaw member and communicating with one face thereof, said second jaw member being rotatable about one of said projecting rods to position the rail-like member between said pair of jaw members and then rotatable to engage said second rod in registering engagement with said channel therein to align said jaw member gripping portions on opposite sides of the rail member.

12. An adjustable fishing rod holder comprising:
- mounting bracket means adapted for attachment to a structural member and providing rigid projecting mounting surfaces,
- a tubular body member open at both ends, one upper end adapted for receiving and accepting various lengths of fishing rod handles, said body member having an elongated slot longitudinally disposed in one side thereof,
- a pair of bracket members having a generally semicircular cross-sectional configuration with radially outwardly projecting flanged ends, said pair of bracket members being disposed about said tubular body member in an opposed relationship in mating contact therewith for positioning one pair of said facing flanged ends of said bracket members to form a first pair of spaced projecting flanges positioned adjacent to and on opposite sides of said tubular body member longitudinal slot and the other pair of said facing flanged ends forming a second pair of spaced projecting flanges located on the opposite side of said tubular body member for pivotally mating with and engaging said mounting bracket means,
- means for attaching said pair of bracket members to said tubular body member,
- attachment means for pivotally mounting said second pair fo spaced projecting flanges to said mounting bracket means for permitting said tubular body member limited arcuate movement with respect to said mounting bracket means and for permitting locking engagement therebetween in any selected position within said limited arcuate traverse,
- a tongue member having a semi-circular cross-sectional configuration and dimensioned to mate with the interior arcuate curce of said tubular body member, one end of said tongue member having a narrowed width dimension and attached to the inner surface of said tubular body member adjacent to said lower open end for positioning said tongue member in a generally mating relationship with the inner surface of said body member and closing said elongated slot disposed therein, said tongue member further having a slight longitudinal outward curvature for biasing the unattached end of said tongue member snugly against the inner surface of said body member,
- a generally wedge-shaped lever block cooperating with said first pair of spaced projecting flanges for providing limited rotational movement therebetween, the wider dimension of said block oriented toward said one upper end of said tubular member, the lower surface of said block substantially covering said tubular member slot, a mounting pin disposed transversely through said lever block and said first pair of spaced projecting flanges for permitting limited rotational movement of said lever block with respect to said flanges from a first position where said lever block bottom surface covers said slot and is in contact with said tubular member outer surface to a second position where said lever block is disposed angularly with respect to said tubular member and exposes said slot, a threaded rod having a handle on one end and a camming head on the other end and threadably disposed through said lever block for projecting said camming head through said tubular member slot into contact with said tongue member, said threaded rod being adjustably positionable into and out of said tubular body slot for permitting said camming head to engage and depress said tongue member into the interior of said tubular member when said lever block is rotated to said first position for causing said tongue member to snugly engage a rod handle inserted into said tubular member one open end, and said camming head of said threaded rod being rotatably pivoted out of contact with said tongue member through said tubular member slot when said lever block is rotated to said second position for causing said tongue member to return to contact with the interior surface of said tubular member and releasing said rod handle and permitting removal thereof from said tubular member.

13. The fishing rod holder as described in claim 12, wherein said structural member is the relatively flat surface of the gunwale of a boat, and wherein said mounting bracket means comprises:

bracket means adapted for mounting on said gunwale relatively flat surface and having a pair of spaced mounting flanges projecting therefrom, and fastening means for rigidly fastening said bracket means to said gunwale surface.

14. The fishing rod holder as described in claim 13, wherein said bracket means comprises a pair of generally L-shaped brackets that are mounted on said gunwale in a spaced relationship with the outwardly projecting legs of each of said L-shaped brackets providing said pair of spaced mounting flanges.

15. The fishing rod holder as described in claim 14, wherein said pair of projecting spaced mounting flanges of said mounting bracket means and said second pair of spaced projecting flanges have transversely aligned apertures therein, and wherein said attachement means comprises:

a bolt having one threaded end for insertion through said transversely aligned apertures in said spaced mounting flanges and said second pair of spaced projecting flanges, and a threaded retaining member for engaging said threaded end of said bolt and cooperating with said spaced mounting flanges and said second pair of spaced projecting flanges for locking said second pair of spaced projecting flanges with respect to said spaced mounting flanges in a selected angular relationship.

16. The fishing rod holder as described in claim 1, wherein said camming head is generally ball-shaped with the outer surface opposite said threaded rod having a slightly flattened configuration for increasing the surface area of said camming head in contact with said tongue member and increasing the frictional forces between said camming head and said tongue member when said lever block is rotated to said first position.

17. The fishing rod holder as described in claim 12, wherein said structural member is a circular or rectangular cross-sectional rail-like member, and wherein said mounting bracket means comprises:

a pair of jaw members positioned in an opposed complementary relationship, each of said jaw members having centrally located gripping portions disposed in the one facing edge thereof and adapted for gripping rectangular and circular cross-sectional members, one of said pair of jaw members having spaced transverse apertures therethrough for cooperating with said body bracket projecting mounting means and said attachment means for mounting said bracket means and said tubular body member thereto, the second one of said jaw members having a pair of holes disposed transversely through the width of said jaw member adjacent to and spaced on opposite sides of said gripping portion thereof and communicating with the edge carrying said gripping portion, a pair of threaded rods fixed to said one of said pair of jaw members and projecting from the edge thereof carrying said gripping portion in a spaced parallel relationship registering with said pair of spaced holes in said second jaw member, said second jaw member being slidable over said projecting rods through said pair of spaced holes for guiding said second jaw member into an opposed spaced position with respect to said one jaw member and registering said engaging portions thereof in an opposed spaced relationship for gripping the rail-like member therebetween, the projecting ends of said threaded rods extending through said second jaw member and projectly freely from the other side thereof, and a pair of fasteners adapted for threadably engaging said freely projecting ends of said pair of rods and engaging said second jaw member for urging said member into clamping engagement with said one jaw member about the rail-like member.

18. The fishing rod holder as described in claim 17, wherein said gripping portion of each of said pair of jaw members comprises a cut-out portion from the facing edges of said jaw members having a configuration consisting of a generally rectangular cut-out section centrally disposed in said edge thereof carrying said gripping portion and a V-shaped notch portion cut centrally into the interior side of said rectangular cut-out section for accommodating rectangular and circular cross-sectional members therebetween.

19. The fishing rod holder as described in claim 17, wherein one of said pair of spaced holes disposed in said second jaw member is a channel having generally semicircular cross-section disposed in said second jaw member and communicating with one face thereof, said second jaw member being rotatable about one of said projecting rods to position the rail-like member between said pair of jaw members and then rotatable to engage said second rod in registering engagement with said channel therein to align said jaw member gripping portions on opposite sides of the rail member.

* * * * *